Feb. 28, 1967 W. H. MUELLER 3,306,847
MOLECULAR SIEVE PROCESS
Filed May 13, 1964
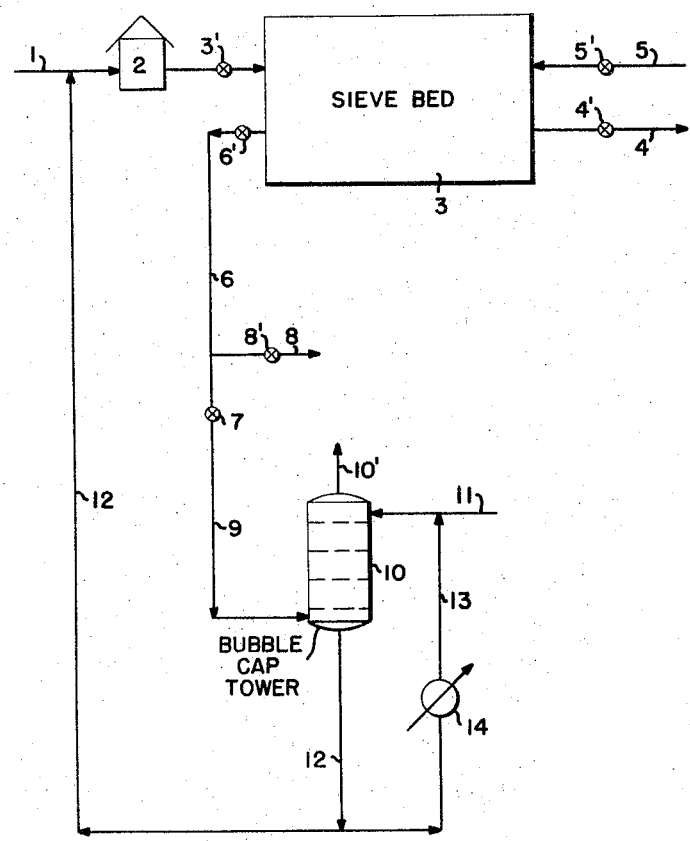
William H. Mueller  Inventor
By *Reuben Miller*  Patent Agent 3,306,847
MOLECULAR SIEVE PROCESS
William H. Mueller, Morristown, N.J., assignor to Esso Research and Engineering Company, a corporation of Delaware
Filed May 13, 1964, Ser. No. 367,107
11 Claims. (Cl. 208—310)

The present invention is concerned with a method of improving the over-all efficiency of a molecular sieve separation process. More particularly, the present invention relates to an improved process for the efficient and economical separation and segregation of straight chain or aromatic hydrocarbons from mixtures comprising straight chain hydrocarbons, branched hydrocarbons, naphthenes and aromatics. Still more specifically, this invention involves maximum heat utilization in the abovementioned processes.

This invention may also be used to aid in the efficiency of the separation of olefins, aromatics and sulfur compounds from a light naphtha feedstream by means of a molecular sieve. This type of separation is more completely described in U.S. Patent 3,098,814 and this patent is hereby incorporated by reference. A further use for this invention would be in the separation of aromatics and/or nonhydrocarbons from saturated hydrocarbons and/or olefins and the separations of olefins from saturated hydrocarbons. Additionally, this invention may be used in the separation of linear components such as normal paraffins from hydrocarbons, particularly petroleum hydrocarbons. A further use for this invention may be found in the removal of aromatics from an olefin stream. Other varied uses for this invention will be obvious to one skilled in the art and need not be enumerated at this time. However, it should be noted that this invention may be utilized with all molecular sieves including Type A and Type X molecular sieves.

It has been known for some time that certain zeolites, both naturally occurring and synthetic, have the property of separating normal from isomeric branched chain hydrocarbons as well as from cyclic and aromatic admixtures. Zeolites have crystal patterns such as to form structures containing a large number of small cavities interconnected by a number of still smaller holes or pores, the latter being of exceptional uniformity of size. Only molecules small enough to enter the pores can be adsorbed, though not all molecules, even though small enough to enter the pores, will be adsorbed. An affinity of the molecule for the adsorbent must be present. The pores may vary in diameter from 3 to 6 A. units to 8 to 15 A. or more, but it is a property of these zeolites or molecular sieves that for particular sieves the pores are of substantially uniform size. The adsorbents with pore sizes of 8 to 15 A. units have a high selectivity for aromatics and nonhydrocarbons. This is due to the polar nature of aromatics and the resulting interaction with the sieve surface. Thus, such adsorbents can be used to separate aromatics and nonhydrocarbons from saturates.

The scientific and patent literature contains numerous references to the adsorbing action of natural and synthetic zeolites. Among the natural zeolites having this sieve property may be mentioned chabasites and analcite. A synthetic zeolite with molecolar sieve properties is described in U.S. Patent 2,442,191. An example of a class of synthetic zeolites which is used to separate normal hydrocarbons from branched hydrocarbons is Type A sieve with divalent cations from the alkaline earth sieves, particularly calcium Type A. These adsorbents are described in U.S. Patent 2,882,243. An example of a class of adsorbents which is used to separate aromatics from saturates is Type X sieve with monovalent and divalent cations from the alkaline and alkaline earth sieves, particularly sodium and calcium Type X. These adsorbents are described in U.S. Patent 2,882,244. Zeolites vary somewhat in composition but generally contain silica, aluminum, oxygen and an alkali and/or alkaline earth element, e.g., sodium and/or calcium, magnesium, etc. A large number of naturally occurring zeolites have molecular sieve activity, i.e., the ability to adsorb a straight chain hydrocarbon and exclude the branched chain isomers. They are described in an article, "Molecular Sieve Action of Solids," appearing in Quarterly Reviews, vol. 3, pages 293–330 (1949), and published by the Chemical Society (London).

The separation of normal from branched chain or aromatic hydrocarbons or mixtures, either for the purpose of enriching the mixture in branched chain, cyclic or aromatic components, or for isolating and recovering of the normal isomer has become increasingly important to industry. Thus, in the preparation of jet and diesel fuels, the presence of normal paraffins degrades the freezing point rating. On the other hand, in the manufacture of synthetic detergents such as alkylaryl sulfonates, a straight chain alkyl substituent makes a better detergency and biodegradable characteristics than a branched chain substituent of the same number of carbon atoms.

In a typical separation process concerning the separation of aromatics and nonhydrocarbons from a hydrocarbon feed by means of a Type X sieve, the feedstock is passed over a Type X sieve. The feedstock is first heated to a temperature of approximately 400° to 800° F., preferably 500° to 750° F. The pressure will be 1 to 500 p.s.i.a. and the amount of feed per cycle will be 0.01 to 10 w./w., preferably 0.02 to 5 w./w. Aromatics are adsorbed onto the sieve bed with the remainder of the feed passing out of the other end of the bed as effluent. After a desired amount of time, a displacing agent is passed through the said bed in order to remove the aromatics which have previously been adsorbed.

A displacing agent is defined as a polar or polarizable material having an appreciable affinity for the sieve compared with the material desired to be desorbed and which will generally have a heat of adsorption approximately equal to the material that it is desired to desorb. Displacing agents are preferably used in the gaseous state. Displacing agents are also referred to as desorbents, displacing mediums and desorbing mediums. Suitable displacing mediums for the process of this invention include $CO_2$, $SO_2$, ammonia, $C_1$–$C_5$ alcohols (such as methyl and ethyl alcohol); glycols such as ethylene glycol; halogenated compounds such as methyl and ethyl chloride and methyl fluoride; nitrated compounds such as nitromethane and the like. A preferred displacing agent has the general formula:

wherein $R_1$, $R_2$ and $R_3$ are selected from the group consisting of hydrogen and $C_1$–$C_5$ alkyl radicals. Ammonia is the especially preferred displacing medium with the $C_1$–$C_5$ primary amines being next in order of preference to ammonia and the $C_1$–$C_{15}$ primary, secondary and tertiary amines, next in that order of preference.

Desirably, the desorption temperature is approximately equal to the temperature of adsorption, 400° to 800° F., preferably 500° to 750° F. and it would in its most preferred case be 675° F. The desorbed material is separated into two fractions. The first fraction is approximately the same composition as fresh feed and is traditionally recycled back to feed surge. This fraction varies from 1 to 30% on fresh feed, preferably 5 to 20%, most preferably about 15% on fresh feed. This fraction is desorbed in approximately 1/10 of the time on desorption.

In order to condense this material so that it can be separated from the displacing medium, an oversized heat exchanger is required operating at a high rate, but only for 1/10 of the time. The second fraction is either recovered as product or recycled to a normal paraffin separation process for further purification or rejected for aromatics removal only. The heat produced in the oversized heat exchanger has traditionally been dissipated. That is to say, it has been put to no constructive purpose.

According to this invention, it has been unexpectedly discovered that feed and desorbate may be contacted in a tower containing spaced trays which may be a bubble cap tower and in this manner the feed surge drum and the recycle condenser may be eliminated while the feed is heated. The tray containing tower to be utilized must be one which will retain liquid on its trays. A variety of towers besides a bubble cap tower may be utilized. They include a sieve tray tower. The contacting may be either countercurrent or cocurrent within the tower. Fresh cold feed is introduced at the tower top and is used to displace heated desorbate liquid on the trays. The cold liquid holdup in the tower is designed to be sufficient to condense the recycle pulse of hydrocarbon plus displacing agent. If the fresh feed is not enough, a pumparound stream can be used with cooling at a low uniform rate. For jet fuel production, the fresh feed is sufficient. The top part of the tower above the trays can be used as a normal paraffin desorbate displacing agent separator for a combined process. The bottom part of the tower below the trays is used as an X type feed surge with sufficient holdup to damp temperature fluctuations. Advantages to be realized by this invention include the elimination of a large recycle condenser, recovery of additional feed preheat and the smoothing out of feed surges. Thus, the instant invention teaches the elimination of a large exchanger by utilizing the heat capacity of the feed to condense a pulse recycle stream. The fresh feed is heated above 100° to 300° F. by this method, preferably 150° to 250° F. Contacting time within the tower may vary between 0.1 to 10 minutes, preferably 0.5 to 5 minutes.

In essence this invention concerns a molecular sieve separation process wherein a preheated hydrocarbon feed is contacted with a molecular sieve under conditions wherein at least a portion of the hydrocarbon is adsorbable on the sieve. The adsorbed portion is periodically displaced with a displacing agent such as those described previously at elevated temperatures thereby obtaining a hot displaced hydrocarbon stream. At least a portion of this hot displaced hydrocarbon stream is passed into a tower zone which contains a plurality of spaced trays and may be a bubble cap tower. Fresh unheated hydrocarbon feed is also passed into the bubble cap tower and the feed is therein contacted with the hot displacing stream to form a mixture. The mixture is, naturally, at a higher temperature than the original hydrocarbon feed. This heated mixture is then passed into the molecular sieve separation zone.

The figure is an illustration of a diagrammatic representation of a preferred process for carrying out the instant invention.

Referring now to the figure, feed to be treated, i.e., jet fuel, boiling in the range of 300° to 550° F. is passed through line 1, heater 2 and into sieve bed 3. Within sieve bed 3 is a 13X molecular sieve. It should be noted that the X sieve is being utilized merely for purposes of illustration and the bed may contain A sieve for use in normal paraffin separation or in any of the other operations outlined earlier in this application. Within heater 2, the fuel is heated to a temperature of 500° to 750° F. The fuel passes through bed 3 and aromatics are removed at this time. Sievate consisting of thermally stable and high luminator jet fuel comes off sieve bed 3 through line 4. At a desired time, the bed is to be desorbed. This desorption takes place by passing displacing agent such as ammonia through line 5 into bed 3. Desorbate containing mainly aromatics and other impurities comes off sieve bed 3 through line 6 and valve 6'. The desorbate is passed through line 6 to valve 7. For the first 1 to 30% of the desorbate, valve 7 is open and 8' is closed and the desorbate passes through to line 7. After approximately 1 to 30%, preferably 5 to 20%, of the desorbate has passed through line 9, valve 7 is closed and valve 8' is opened and the remaining desorbate is recovered through line 8. Returning to the first portion of the desorbate which at a temperature of about 500° to 750° F. passes through line 9; this portion passes from line 9 into bubble cap tower 10. Bubble cap tower 10 may be any tray containing tower which will retain liquid. The bubble cap tower 10 contains several trays. In this case, it contained 7. Desorbate is introduced into the bottom of the tower. Displacing agent is flashed off the top of the tower through line 10'. Fresh cold feed is introduced at the tower top and is used to displace heated liquid on the trays. The cold liquid holdup in the tower is designed to be sufficient to condense the recycle pulse of hydrocarbon plus ammonia. If the fresh feed is not enough, a pumparound stream which passes through line 13 and is cooled in exchanger 14 can be used to supply sufficient cold feed. The cold liquid in the tower cools the effluent stream and condenses the desorbate. In so doing, it is in turn heated by the effluent. Feed and desorbate, which have now been heated to a temperature of about 180° to 230° F., are removed from the bottom of tower 10 through line 12 and are passed to line 1 from whence the combined desorbate and feed enter heater 2. Within heater 2 the feed is no longer required to be subjected to as much as was required previously, since now the heat required is only that necessary to bring the feed from 180° to 230° F. up to 500° to 750° F., a considerable saving from bringing feed at a temperature of 100° F. to a temperature of 500° to 750° F. A portion of the feed may be passed into line 13 and then into heat exchanger 14 where it is heated to a temperature of 500° to 750° F. and then recycled to tower 10 through line 11.

The invention will be further illustrated by the following examples.

*Example 1.*—In this example, an apparatus similar to that utilized in the figure is employed. A $C_9$ to $C_{18}$ virgin distillate from Middle Eastern crude is passed through line 1 into heater 2 where it is heated to a temperature of 675° F. The feed is then passed through valve 3' into the sieve bed 3. At this time the sieve bed contains 5A molecular sieve which is utilized to recover normal paraffins. Sievate passes out of the bed through line 4 and valve 4'. After about 20 minutes, the flow of normal paraffins is stopped and valve 3' is closed. A displacing agent which is ammonia is passed through line 5 and valve 5' into sieve bed 3. Normal paraffins are displaced from the bed through line 6 and valve 6' and travel through line 6 to valve 7 which is open while valve 8' is closed. The paraffins pass through valve 7 and into line 9. After about 15% of the described material has passed through valve 7, valve 7 is closed and valve 8' is opened and the remainder of the normal paraffins are passed through line 8 and recovered. The material in line 9 is passed to the bottom of tower 10. At this time the material is at a temperature of about 675° F. Fresh feed is passed through line 11. The feed is at a temperature of about 100° F. Feed and desorbate are contacted for a period of about 1 minute. The total effluent is cooled and the desorbate is condensed during which time ammonia is flashed off through line 10'. Desorbate and feed are removed from the bottom of tower 10 through line 12. At this time the combined desorbate fresh feedstream is at a temperature of about 180° to 230° F. The combined stream is passed through line 12 back into line 1 and then through heater 2 where it is heated to a temperature of 675° F.

Although the above-disclosed invention has been described with a certain degree of particularity, it will be

What is claimed is:

1. A molecular sieve separation process wherein a preheated hydrocarbon feed is contacted with a molecular sieve under circumstances wherein at least a portion of said hydrocarbons is adsorbable on said sieve, and periodically displacing said adsorbed portion from said sieve with a displacing agent at elevated temperatures to obtain a hot displaced hydrocarbon stream, the improvement which comprises passing at least a portion of the said hot displaced hydrocarbon stream into a tower zone containing spaced contacting trays, passing fresh hydrocarbon feed at a temperature lower than said hot hydrocarbon stream into the said tower zone, whereby a mixture of said hydrocarbon stream and said hydrocarbon feed is formed, removing the said mixture from said tower zone, said mixture being at a higher temperature than said feed temperature, passing said heated mixture into said molecular sieve separation zone.

2. The process of claim 1 wherein said heated mixture of fresh feed and displaced hydrocarbon are first passed into a heating zone before being passed into said molecular sieve separation zone.

3. In a molecular sieve separation process wherein a preheated hydrocarbon feed is contacted with a molecular sieve under conditions wherein at least a portion of said hydrocarbon is adsorbable on said sieve and periodically displacing said adsorbed part from said sieve with a displacing agent at elevated temperatures to obtain a hot displaced hydrocarbon stream, the improvement which comprises passing at least a portion of the said hot displaced hydrocarbon stream into the bottom region of a tower zone, said tower zone containing spaced contacting trays, passing fresh hydrocarbon feed at a feed temperature lower than said hot hydrocarbon stream into the top region of said tower zone, countercurrently contacting the said feed and said hot displaced stream whereby a mixture of said feed and said displacing agent is formed, said mixture being at a temperature higher than said feed temperature, passing said heated mixture into the said molecular sieve separation zone.

4. The process of claim 3 wherein the fresh hydrocarbon feed and displaced hydrocarbon mixture removed from the said tower zone is 50° to 200° F. higher in temperature than the fresh feed which was passed into said tower zone.

5. The process of claim 3 wherein the first 1 to 30% of the displaced hydrocarbon is passed into the said tower zone.

6. The process of claim 3 wherein the said displaced hydrocarbon is selected from the group consisting of normal paraffins and aromatics.

7. The process of claim 3 wherein the said fresh feed and said displaced hydrocarbon are contacted within the tower zone for a period of 0.1 to 10 minutes.

8. In a molecular sieve separation process wherein a preheated hydrocarbon feed is contacted with a molecular sieve under circumstances wherein at least a portion of said hydrocarbon is adsorbable on said sieve, and periodically displacing said adsorbed part from said sieve with a displacing agent at a temperature of 500° to 750° F. to obtain a hot displaced hydrocarbon stream, the improvement which comprises passing at least a portion of the said hot displaced hydrocarbon at a temperature of 500° to 750° F. into the bottom region of a bubble cap tower zone, passing fresh hydrocarbon feed into the top of said tower zone, contacting the said feed and the said displaced hydrocarbon thereby forming a mixture of the two, removing the said mixture of feed and displaced hydrocarbon at a temperature 50° to 200° F. higher than the temperature of the said fresh feed when said fresh feed was passed into said bubble cap tower zone, passing the said heated mixture of fresh feed and displaced hydrocarbon into the said molecular sieve separation zone.

9. The process of claim 8 wherein the said heated mixture is first passed into a heating zone wherein it is heated to a temperature of 500° to 750° F. and then passed into said molecular sieve separation zone.

10. The process of claim 8 wherein the said displacing agent is removed from the top of the said tower zone.

11. The process of claim 8 where the said displacing agent is ammonia.

References Cited by the Examiner

UNITED STATES PATENTS 3,248,322   4/1966   Asher _____ 208—310

ALPHONSO D. SULLIVAN, *Primary Examiner.*